United States Patent

[11] 3,594,037

| [72] | Inventor | Gale K. Sherman<br>Tustin, Calif. |
|---|---|---|
| [21] | Appl. No. | 27,032 |
| [22] | Filed | Apr. 9, 1970 |
| [45] | Patented | July 20, 1971 |
| [73] | Assignee | McDonnell Douglas Corporation |

[54] CABIN ATTENDANT SEAT
9 Claims, 6 Drawing Figs.

[52] U.S. Cl.................................................... 297/14,
297/61, 297/316, 297/332
[51] Int. Cl...................................................... A47c 9/06
[50] Field of Search........................................... 297/14, 61,
112, 114, 316, 320, 332, 334

[56] References Cited
UNITED STATES PATENTS

| 1,132,004 | 3/1915 | Friese............................ | 297/14 |
| 1,761,673 | 6/1930 | Laursen.......................... | 297/14 |
| 3,093,414 | 6/1963 | Eames et al.................... | 297/14 X |

*Primary Examiner*—James C. Mitchell
*Attorneys*—Walter J. Jason, Donald L. Royer and Robert O. Richardson

ABSTRACT: A compact thin profile cabin attendant seat folding automatically when occupant arises. An extensible headrest, tilting backrest and forwardly moving seat bottom frame are interlinked for simultaneous movement.

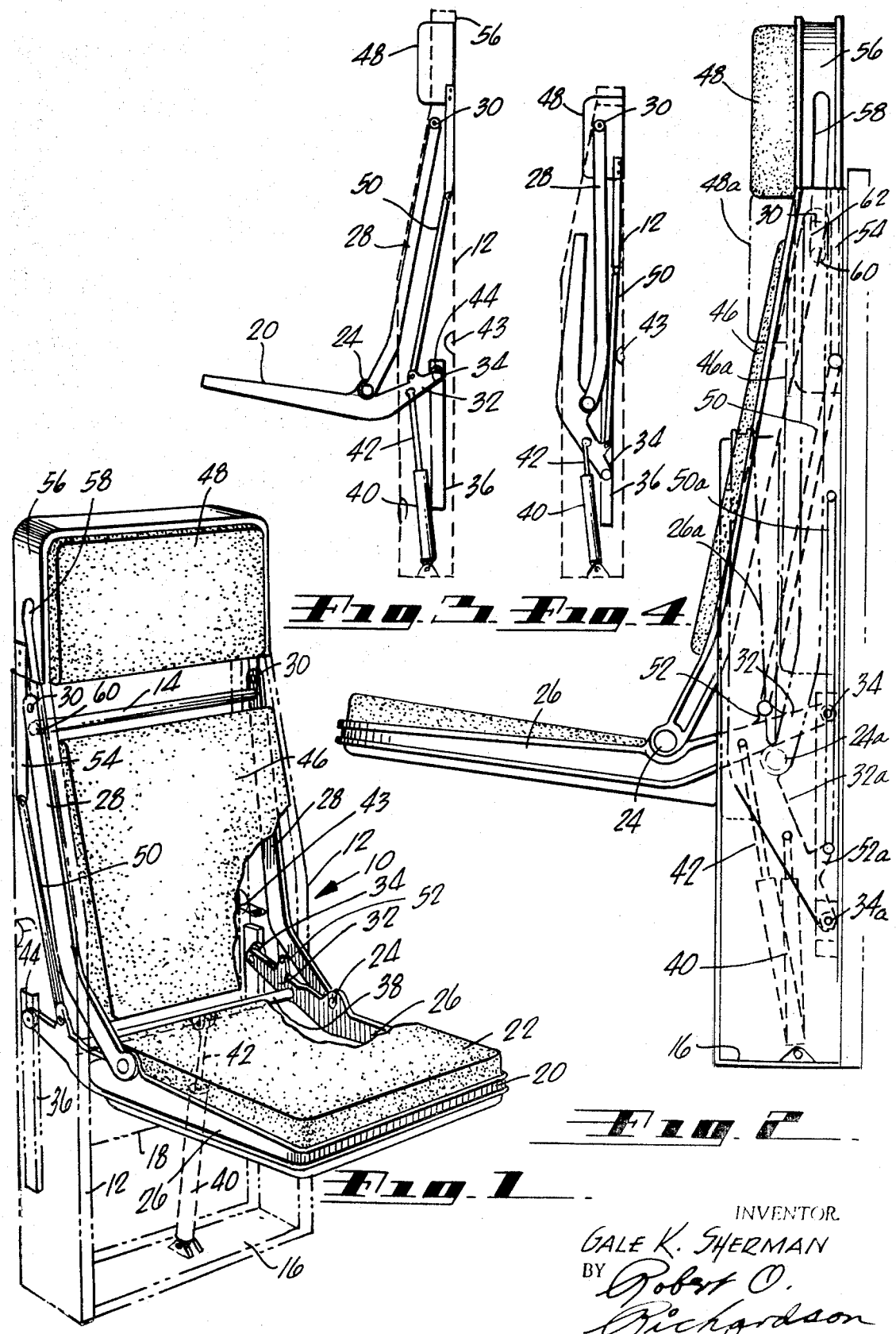

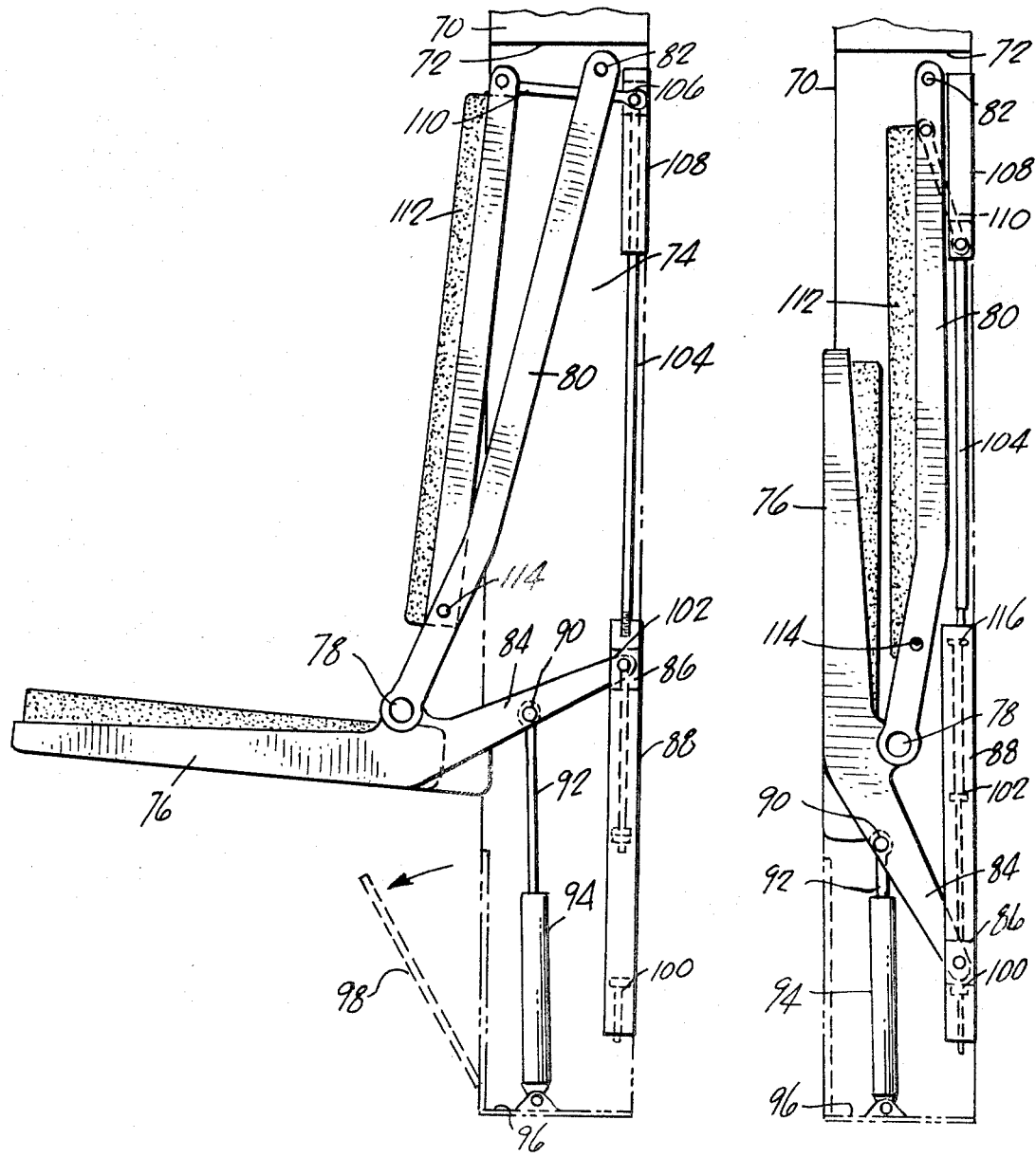

CABIN ATTENDANT SEAT

BACKGROUND OF THE PRESENT INVENTION

When an aircraft takes off, lands, or is flying in a turbulent environment, cabin attendants are required to be seated and restrain themselves with a seat belt. Except for these occasional uses, the seat should be inconspicuous and out of the way. A thin collapsible wall mounted seat is preferable for this purpose. Folding seats are usually found in taxicabs, theaters, auditoriums and along the walls of many buildings. The seat bottom usually folds out for use and is supported by a linkage and, in many cases, a spring device is provided so that the seat bottom will automatically fold up after the occupant has arisen. However, none of these known seats display the features and advantages of the cabin attendant seat of the present invention.

SUMMARY OF THE PRESENT INVENTION

The cabin attendant seat of the present invention in one form includes a backrest that is attached to support links that are hinged at the top to a mounting frame and pivotally to a seat bottom frame at the lower end. The seat bottom frame has an extended arm at each side, rearwardly extending from the pivot point between the seat bottom frame and the support links. At the end of each extended arm is a roller which moves along a vertical guide attached to the mounting frame. When the seat is extended the linkage is such that the seat bottom frame moves outwardly as it pivots downwardly and the seat backrest tilts forwardly at the bottom. A push rod is connected to the seat extended arm and causes a headrest to move vertically as the seat bottom frame is pivoted. In another form, the seat backrest moves forwardly from a recess where it is housed during nonuse. When folded, the seat backrest is vertical, with the seat bottom folded upward against the seat backrest and the headrest moved downwardly over the top portion of the backrest. For automatic closing a constant force air spring is used which provides a controlled positive force without the violent spring action normally found in such seats. Its rate of retraction permits the seat belt straps to retract within the mounting frame before the seat bottom frame is completely folded up. The cabin attendant seat thus provided is of simple design and relatively free of maintenance problems and malfunctions, yet provides a thin profile folded package when not in use.

BRIEF DESCRIPTION OF THE DRAWINGS

FIG. 1 is a perspective view of a first embodiment in its use position;

FIG. 2 is a side elevational view of the seat in use position and in which phantom lines show its structure in stored position;

FIGS. 3 and 4 are schematic elevational views of a first embodiment in its use and stored position with details removed for clarity in illustrating seat and headrest movement; and FIGS. 5 and 6 are elevational views of another embodiment in its use and stored positions.

Referring now to FIGS. 1 and 2 there is shown a seat mounting frame 10 including a pair of vertical spaced side supports 12 shown in phantom lines. These side supports are connected at the top by a spacer bar 14 and a floor plate 16 at the bottom. This mounting frame may be fastened to a floor or against a wall, as desired. Connecting the side supports 12 across the front and at the lower portion of the seat is a door or panel 18 behind which may be stored selected items, as desired. A U-shaped seat bottom frame 20 is adapted to receive a suitable seat cushion 22 of appropriate design. This U-shaped seat bottom frame has pivot points 24 intermediate the ends of the side legs 26 so that the bottom frame 20 may be pivotally secured to the side supports. Support links 28 are pivotally connected by their upper ends at pivot points 30 to the side supports 12. They extend downwardly and outwardly to terminate at their lower ends at pivot points 24 to pivotally connect with seat bottom frame 20. Extending rearwardly from the pivot points 24 are extended arms 32 which terminate in rollers 34 adapted to ride within vertical guides 36 within the side supports 12. Attached between extended arms 32 and rearwardly of pivot points 24 is a spacer bar 38. An air spring 40 is pivotally mounted on floor plate 16 and has a piston rod 42 pivotally connected to the spacer bar 38. This air spring closes the seat at a controlled rate when the occupant arises. This air spring combines a pneumatic actuation with a tension spring within the air chamber and utilizes a variable air bleed to adjust and control its rate of actuation. Such air springs per se are well known. Preferably, its rate of closure will be sufficiently slow to enable retraction of seat belt straps 43 within the mounting frame 12 before seat bottom frame 20 is moved to its stored position.

When the seat bottom frame 20 is folded down for use, the pivot points 24 are caused to move forwardly in accordance with the length of the extended arms 32, since rollers 34 at the ends of the extended arms 32 remain in their vertical orientation within vertical guides 36. Appropriate stops 44 on guides 36 limit the upward movement of rollers 34 in order to angularly orient the plane of the U-shaped seat bottom frame 20 relative to the floor for optimum seating comfort. Support links 28 have a backrest 46 connected thereto so that the upper portion of the backrest remains at the support link pivotal points 30 while the lower portion tilts outwardly with the lower ends of the support links 28. The lower ends of support links 28 curve outwardly to terminate at the pivot points 24 on the seat bottom frame 20. This permits extra length of the extended arms 32 to thus accommodate the weight of the occupant. The seat bottom frame 20 is limited in its downward movement through the support links 28 and by the proper positioning of stops 44 in the vertical guides 36.

A headrest 48 is provided and is adapted to move upwardly when the U-shaped seat bottom frame 20 is moved downwardly. This is accomplished through a linkage which includes push rods 50 pivotally connected at their lower ends to ears 52 on the extended arms 32 rearwardly of pivot points 24. The upper ends of the push rods 50 are connected to sliding mounting brackets 54 which are connected at each end of U-frame 56 of headrest 48. Vertically oriented slots 58 in U-frame 56 are guided by guide pins 60 at each end of spacer bar 14 as the headrest 48 moves up and down. As can be seen in FIG. 2, slots 58 are slanted outwardly at their lower ends 62 to guide the headrest 48 outwardly as it is moved downwardly. This permits the headrest 48 to be positioned over the upper portion of backrest 46.

The attendant seat is shown in its stored position by phantom lines in FIG. 2 and in its position of use by solid lines (and dashed lines where the structure is hidden from view) as a convenience in comparing the two positions. Additionally, the structure shown by phantom lines is identified by like numerals followed with the suffix A. For example, the seat bottom frame side legs 26, in use position, is shown in stored position as 26A, pivot point 24 moves rearwardly to stored position 24A as extended arms 32 pivot downwardly to the position shown as 32A. As backrest 46 pivots back to stored position 46A, headrest 48 moves over its top portion to position 48A.

The operation of the attendant seat can best be understood with reference to FIGS. 3 and 4. In FIG. 3 the seat bottom frame 20 is in an occupant's use position where it is maintained by the weight of the occupant. The lower end of swinging support link 28 has been moved outwardly with respect to the side supports 12 and connects with the seat frame 20 at pivot point 24, as shown. The extended arm 32 on the seat frame 20 extends rearwardly from the pivot point 24 and terminates in rollers 34 which abut a stop 44 at the upper end of vertical guide 36. Links 28 are suspended from side supports 12 at their upper ends which are pivotally connected at pivot point 30 to the side supports 12. The push rod 50 has extended the headrest 48 to its uppermost position. When the occupant arises, air spring 40 retracts the seat bottom frame 20 to its stored position, as shown in FIG. 4. As the pivot point 24 is moved inwardly and as the rollers 34 move downwardly in the vertical guides 36, the push rod 50 moves downwardly and thus the headrest 48 is moved to its lower stored position as shown in FIG. 4.

Reference is now made to an alternate form shown in FIGS. 5 and 6. In this embodiment, it is desirable for the seat, in its folded up or stored position, to be recessed within a wall structure so that none of the seat structure extends out into the cabin. This requires the seat backrest to move into the recess and behind the seat bottom frame in stored position and yet move outwardly to a position of use when such use is desired. A push rod actuation as the seat bottom frame pivots forwardly is similarly utilized.

Referring now to FIG. 5 there is shown a wall surface 70 having a recess 72 into which seat side supports 74 may be positioned. In a manner similar to the first embodiment, there is a seat bottom frame 76 pivotally connected at pivot point 78 to a pair of swinging support links 80 which, in turn, are pivoted at points 82 to the side supports 74. As in the other embodiment, the seat bottom frame 76 has rearwardly extending arms 84. These extended arms 84 terminate in a slide 86 which moves vertically within a slide guide 88 affixed to the side supports 74. The extended arms 84 also have a connecting spacer bar 90 therebetween and pivotally connected thereto is a piston rod 92 of air spring 94 which, in turn, is pivotally mounted to a floor plate 96, all in a manner similar to that in the first embodiment. At the front lower portion of the side supports 74 is a pivotal door 98 behind which may be stored selected items. As before, the air spring 94 causes the seat bottom frame 76 to pivot upwardly when not in use to the stored position as shown in FIG. 6. At the bottom of slide 88 is an adjustable stop member 100 against which the slide 86 abuts in the folded up position of the seat frame 76. A vertical adjustment of this stop member 100 will regulate the alignment of the seat bottom frame 76 with the wall surface 70 when in stored position. Vertically movable within the slide 88 is a lower end 102 of a push rod 104 which is adapted for vertical movement at the rear of the side supports 74. The upper end of push rod 104 terminates in a slide 106 which is adapted for vertical movement in an upper guide 108. A link 110 is pivotally mounted at one end to the sliding block 106 and its other end is pivotally mounted to the top portion of backrest 112. The lower end of backrest 112 is pivotally mounted to the swingable support links 80 at pivot point 114.

As can be seen in FIG. 6, when the seat bottom frame 76 is tilted upwardly to nonuse position, the extended arms 84 are pivoted downwardly and the sliding blocks 86 abut the stop member 100. Spaced above block 86 is the lower end 102 of push rod 104. End 102 extends downwardly from an upper limit stop 116 at the upper end of slide 88. Backrest 112 at its upper and lower ends is recessed within the recess 72 and the outer surface of the seat frame 76 is flush with the outer surface 70 of the structural wall. As can be seen upon inspection of both FIG. 5 and FIG. 6, as the seat bottom frame 76 pivots outwardly and the extended arm 84 moves upwardly, the slide 86 engages the end 102 of push rod 104 and pushes upwardly to the stop member 116 in slide 88. This causes the slide 106 at the upper end of push rod 104 to move upwardly in guide 108 and, because the backrest 112 is pivoted at point 114 to support links 80, the link 110 pivots outwardly, causing the upper portion of backrest 112 to move outwardly from the recess. Conversely, when the seat bottom frame 76 returns from the position shown in FIG. 5 to that in FIG. 6, the block 86 no longer holds the push rod 104 in its upper position. The push rod is permitted to drop with the rear end of link 110 moving downwardly. Hence, the upper portion of seat rest 112 moves inwardly.

Having described illustrative embodiments of this invention, it is to be understood that other variations are possible and that these deviations from the embodiments just described are to be considered as part of the present invention.

I claim:
1. A cabin attendant seat comprising:
   side supports adapted to be mounted in upright position,
   swinging support links having upper ends pivotally mounted to said side supports,
   a seat backrest connected to said links,
   a seat bottom frame having rearwardly extending arms, said frame being pivotally mounted to lower ends of said links,
   lower vertically oriented guides on said side supports adapted to maintain the ends of said arms in vertical movement,
   a push rod operably connected to said arms for vertical movement therewith,
   an upper vertically oriented guide on said side supports adapted to maintain the upper end of said push rod in substantially vertical movement.
2. A cabin attendant seat as in claim 1 wherein a headrest is mounted on said side supports and adapted for substantially vertical movement upon actuation of said push rod by vertical movement of said ends of said arms.
3. A cabin attendant seat as in claim 2 wherein said headrest has substantially vertical slots and said side supports have guide pins thereon extending into said slots to guide movement of said headrest.
4. A cabin attendant seat as in claim 3 wherein said slots extend from downwardly and forwardly to upwardly and rearwardly to thereby position said headrest in its downward position over the top portion of said backrest.
5. A cabin attendant seat as in claim 1 wherein an air spring is mounted thereto to bias said seat bottom frame arms downwardly.
6. A cabin attendant seat as in claim 1 wherein stop means is provided to limit the upward movement of said ends of said arms.
7. A cabin attendant seat as in claim 1 wherein vertically adjustable stop means limits downward movement of said ends of said arms.
8. A cabin attendant seat as in claim 1, said backrest being pivotally mounted at its lower end to said support links, and a link pivotally connected to the top portion of said backrest and to the upper end of said pushrod whereby vertical movement of said push rod causes forward and rearward movement of said backrest top portion.
9. A cabin attendant seat as in claim 1 wherein said side supports are positioned within a recess in a wall structure having a front surface, means for moving said backrest rearwardly of said front surface and into said recess when said seat bottom frame is pivoted upwardly, said means moving said backrest forwardly from said recess when said seat bottom frame is pivoted downwardly for use.